United States Patent Office

3,562,177
Patented Feb. 9, 1971

3,562,177
AMMONIA CONTAINING SILICA-AND-ORGANO-SILICA-AEROGEL THICKENING AGENTS AND THEIR PREPARATION
Harry Teicher and Ralph Marotta, St. Louis, Mo., assignors to Monsanto Company, St. Louis, Mo., a corporation of Delaware
No Drawing. Original application Dec. 9, 1966, Ser. No. 600,359, now Patent No. 3,455,826, dated July 15, 1969. Divided and this application Jan. 3, 1969, Ser. No. 821,524
Int. Cl. B01j *13/00;* C09c *3/00*
U.S. Cl. 252—316  5 Claims

ABSTRACT OF THE DISCLOSURE

The present invention provides a novel thickening agent which comprises (a) finely divided particles of an amorphous, hydrophilic silica aerogel having at least one silanol group per square millimicron of surface area thereof and (b) containing at least 0.10% by weight ammonia, based on the weight of such aerogel, but less than 2.5% by weight ammonia. The ammonia provides a coating on said aerogel by being hydrogen bonded by hydrogen bonding between the silanol group of the aerogel and the nitrogen atom of the ammonia. The process of preparing the above thickening agent comprises the steps of contacting such aerogel with the ammonia for a period of time and under certain pressure and temperature conditions, e.g. 1 p.s.i.g. and 70° C. respectively, until the aerogel is coated, i.e. hydrogen bonded, with ammonia.

---

This is a division of application Ser. No. 600,359 filed Dec. 9, 1966 now U.S. Pat. No. 3,455,826, July 15, 1969.

The present invention generally relates to novel thickening agents, processes for producing the same, and to liquids thickened with such novel thickening agents. More particularly, the present invention relates to certain treated silica materials, and to organic liquid compositions or formulations containing, for example, plastic or resinous substances and thickened with small amounts of such treated silica materials.

The desirability of thickening organic liquids for use in certain applications has been recognized in the prior art and it has been proposed theretofore to thicken a variety of such liquids by incorporating therein inert inorganic materials including mica, diatomaceous earth, talc, alumina, graphite, and the like, and in particular, silica aerogels. For example, it has been proposed, in U.S. Patent 2,260,625, issued to Samuel S. Kistler, to thicken oily liquids, such as lubricating oils, and to convert such oils into greases by incorporating silica aerogels in amounts up to as high as 50% in such oils. Silica aerogels described in U.S. Patent 2,285,449, issued June 9, 1942, to Morris D. Marshall and U.S. Patent 2,285,477, issued June 9, 1942, to John F. White have also been used to thicken oils. Also, for example, it has been proposed in U.S. Patent 2,892,730, issued to Harry Kloepfer and Otto Schweitzer, to thicken organic liquids containing high molecular weight film formers, such as nitrocellulose, cellulose acetate, polyvinyl acetate, chlorinated rubber and the like dissolved in organic solvents, with oxides of silicon, aluminum and titanium, to prevent the settling of mineral fillers therefrom.

It has also been proposed in U.S. Patent 2,610,960, issued to Birger W. Nordlander, to thicken, and/or render thixotropic coating and filling compositions such as polymerizable organic liquids consisting of liquid polyester resins by the incorporation of vermiculite in an amount as high as 50% by weight of the vermiculite in such liquids. It has also been proposed in U.S. Patent 2,887,461, issued to Eugene V. Horst, to render thixotropic, laminating compositions consisting of solid polyester resins dissolved in styrene by the incorporation of silica aerogels, such as the silica aerogel described in the aforesaid Kistler, Marshall, or White patents or mixtures of such silica aerogels and alumina in amounts as high as 20% by weight of such inorganic materials in the liquids. By thickening and/or rendering such liquids thixotropic, it has been possible to substantially overcome the problem of drainage of such compositions away from the coated or filled objects to which the composition has been applied.

In U.S. Patent 3,210,273, issued to Thomas A. Taulli, it has also been proposed to thicken organic liquid compositions by the incorporation therein of amorphous organo-silica aerogels having certain physical and chemical characteristics different from the aforementioned Marshall and White aerogels.

However, the above-described thickening agents possess certain disadvantages, in that (except for the aerogels of the Taulli patent) relatively large amounts of such materials are required to significantly thicken or increase the viscosity of organic liquids and/or render these liquids capable of forming thixotropic gels. Thus, for example, the thickening agents when used in large quantities, in some instances, adversely affect the properties of such organic liquids or the use thereof, while in other instances, the cost of these thickening agents renders their use, in the large quantities normally required, economically prohibitive. Although silica aerogels of the type described in the aforementioned Marshall or White patents have been used as thickening agents for oils, the commercial utility of these materials for thickening polymerizable organic liquids, such as plastisols, polyesters and epoxide resins, prior to the curing of these materials is not of general applicability under all conditions of mixing and concentrations of silica desired. In using liquid resins (particularly the polymerizable resins, for example, polyesters or solutions thereof) the liquids are applied as filling and coating compositions or films as desired, following which the curing of the resin is caused to take place. One of the problems encountered in applying liquid resins, for example, in the fabrication of laminates such as fiber glass, is the tendency of the liquid to flow or drain away from the surface to which it is applied when such surface is not disposed in the horizontal plane, as is frequently the case. Thus, it has been necessary to incorporate relatively large amounts, e.g., usually in excess of 10% by weight, of the silica aerogels of Marshall and White in such polymerizable liquids to obtain adequate thickening and prevent drainage, although it is known that amounts in excess of 5% or 6% by weight of a silica aerogel in such liquids usually adversely affect the properties of the polymers when cured. Generally stated, the silica aerogels per se of the type described in the aforementioned Marshall or White patents are relatively inefficient at lower concentrations, i.e., <10%, and uneconomical at higher concentrations, i.e., >10%, for use as thickening agents for organic liquids.

The disadvantage associated with the aerogels of the Taulli patent, U.S. 3,210,273, is that while organic liquids can be thickened by incorporating therein the Taulli aerogels per se, the viscosities of the thickened liquids are not as high as may be desired in certain instances and in certain organic liquids, particularly at low silica weight levels (for example, 2% by weight or less). Consequently, there is a need for thickening agents which impart thixotropy to mobile organic liquids or fluids and which are even more efficient as thickeners on a weight basis than those disclosed in the Taulli patent U.S. 3,210,273.

In accordance with the present invention, it is possible to thicken organic liquids by incorporating in such liquids certain hereinafter defined thickening agents which are improved and more efficient as thickeners for a variety of organic liquids than those silica aerogels heretofore known in the prior art.

Accordingly, it is one object of the present invention to provide novel thickening agents, particularly novel silica materials, and novel processes for producing the same.

It is a further object to provide organic liquids thickened with the novel thickening agents.

It is another object of this invention to provide compositions comprising organic liquid oily or lubricating substances thickened with relatively small amounts of certain treated silica aerogels.

It is also an object of this invention to thicken organic liquids economically and/or without appreciably altering the useful properties of such liquids or the end products made therefrom.

It is a more particular object of the present invention to provide compositions comprising liquid plastisols or resins thickened and/or made thixotropic by the incorporation therein of relatively small amounts of certain novel treated silica aerogels and which are useful in a wide variety of commercial applications.

These and other objects and advantages of the present invention will be or become apparent from the following description and the appended claims.

The present invention, in part, provides a process for preparing certain novel thickening agents, which process comprises contacting (1) finely divided solid particles of a silica aerogel, preferably an aerogel having substantially no reactive or neutralizable halogen, having at least one silanol group, preferably from about 4 to about 12 silanol groups, per square millimicron of surface area thereof, and preferably being amorphous and hydrophilic in character, with (2) gaseous or liquid ammonia (hereinafter referred to as ammonia, for convenience) in an amount and for a period of time sufficient to provide a coating on said silica aerogel particles of at least 0.10% by weight ammonia, but preferably not more than that amount of ammonia required to provide a substantially effective thickening agent, based on the weight of such silica aerogel until there is formed an ammonia-treated thickening agent, i.e. ammonia-coated silica aerogel particles, characterized in having hydrogen bonding between the hydroxyl portion of such silanol group and the nitrogen atom in the molecular structure of ammonia. The quantity of ammonia used in the process of this invention is described in more detail hereinafter, but, in general, is sufficient to provide a coating on the surface of such silica aerogel containing less than 2.5%, preferably from about 0.10% to about 2.0% by weight ammonia, based on the weight of such silica aerogel particles. Since the aforementioned solid silica aerogel particles only have a certain number of silanol groups which can be hydrogen bonded with ammonia, it has been found, as hereinafter described more fully, that the weight of the ammonia coating seldom exceeds 2.5% by weight.

By practicing the aforementioned process, there is produced a novel thickening agent, which forms another part of the present invention and which is the aforementioned ammonia-coated silica aerogel (solid particles) which have substantially the same characteristics (but a significantly increased and/or improved thickening capacity) as the starting silica aerogel per se, e.g., the ammonia-coated silica aerogel particles are also amorphous and hydrophilic. While these novel thickening agents can be utilized for a wide variety of applications, they are particularly suitable for use in thickening organic liquids, and this utility is the one which will be more specifically described hereinafter.

The novel thickening agents of this invention include the silica aerogel which has been contacted or treated with ammonia by certain methods as herein described. Such aerogel is characterized, as previously mentioned, by having at least one reactive silanol group per one square millimicron, preferably from about 4 to about 12 silanol groups per one square millimicron, of the surface area thereof and which, when contacted with gaseous ammonia (liquid ammonia can be used if one so desires, however, heavy duty pressure equipment would be necessary to handle the ammonia), undergoes "hydrogen bonding" between the nitrogen atom of the ammonia and the hydroxyl portion of the silanol group. (The number of silanol groups per square millimicron of particle surface area is measured and calculated by the procedure set forth on page 242 of The Colloid Chemistry of Silica and Silicates, by Ralph K. Iler, Cornell University Press, Ithaca, N.Y., 1955, which publication is incorporated herein by reference.)

As a preferred embodiment of the present invention there is provided a thickening agent consisting essentially of (a) finely divided particles of an amorphous, hydrophilic, organo-silica aerogel, characterized by containing substantially no reactive or neutralizable halogen, and comprising a silica polymer having siloxy groups and having from about 4 to about 12 silanol groups per square millimicron of surface area, and coated with (b) ammonia which is present in a concentration of from about 0.10% to about 2.0% by weight, based on the weight of such silica aerogel. Such thickening agent is also characterized by being amorphous and hydrophilic, by having hydrogen bonding between the hydroxy portion of the silanol groups and the nitrogen atoms of such ammonia, and having an average particle size of between about 1.0 and 2.5 microns, a specific surface area of from about 100 to about 400 square meters per gram, and an external surface area of from about 1.70 to 1.95 square meters per gram. In addition to the above characteristics, such thickening agents also contain from about 0.4% to about 1.2% by weight carbon and from about 0.9% to about 1.5% by weight hydrogen chemically bound to a portion of the siloxy groups.

The aforementioned "hydrogen bonding" is shown more specifically in the partial structure set forth below in Formula I.

(I)

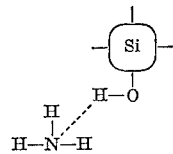

As will be more fully pointed out hereinafter in the specific examples, the infrared spectroscopic investigation of the ammonia-coated silica particles substantiates the presence of hydrogen bonding as shown in the above partial structure I. The exact mechanism of how the "hydrogen bonded" ammonia coating on the silica particles promotes a substantial increase in thickening ability or efficiency when such particles are incorporated in a liquid, is not known. In any event, this increase in thickening efficiency by using the novel ammonia-coated silica aerogel is readily evident from the results disclosed in the subsequent examples, such increase not being achieved by the non-ammonia coated silica aerogel thickening agents of the prior art.

In regard to the aforementioned "hydrogen bonding" mechanism, it should be understood that the term "coating", as used and applied herein, means the bonding of the ammonia molecules by ionic forces to the silanol groups positioned on the surface of the silica particles (aerogel), herein described. This bonding then is the same as or equivalent to the hydrogen bond which is formed or occurs substantially by ionic forces and which is a bond by hydrogen between two atoms, i.e., nitrogen (of the ammonia) and oxygen of the silanol group in the present case. Consequently, the term "coating" is used with the aforementioned connotation and is more specific than the word coating as defined, for example, in the World Book Encyclopedia Dictionary, C. L. Barnhart, published by Doubleday and Company, Inc., 1964, page 378, wherein it is defined as "a layer covering a surface." This dictionary definition would lead one to believe that the "layer" would be a continuous or all encompassing one of the total surface area. However, since the silica particle has only a certain amount of silanol groups per square millimicron of surface area, only such groups can have hydrogen bonding and the remaining surface area is thus "exposed" or "not covered or coated." Thus, the term "coating," as previously mentioned, connotates a more limited meaning (i.e., hydrogen bonding over a limited surface area) than that usually associated with the word.

In addition to the above, the term "hydrogen bonding", as used herein, is to be understood as meaning the kind of hydrogen bonding which is described in The Nature of the Chemical Bond, L. Pauling, 2nd Edition, Cornell University Press, Ithaca, N.Y., 1940, Chapter IX, pages 284–315, which publication is incorporated herein by reference.

Another aspect of the herein described hydrogen bonding is the fact that this "hydrogen bond" between the oxygen of the silanol group and the nitrogen of the ammonia is a fairly weak bond in that it is subjected to being broken by relatively elevated temperatures, i.e., greater than 150° C. and/or low pressures, i.e., less than atmospheric pressure, for example, 20 millimeters (mm.) of mercury absolute. The effect of the application of heat to the ammonia-coated silica particle is more vividly shown in the following Equation II.

(II) 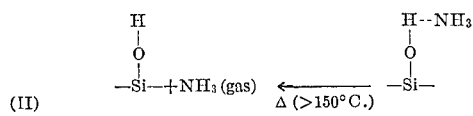

In the past, a wide variety of commercially available silica products such as silica gels, arc silicas, fume silicas (i.e., those silicas which are generally prepared by the reaction of a silicon halide such as silicon tetrachloride, hydrogen, and oxygen—supplied as air—in furnaces operated at high temperatures and which contain minor amounts, e.g., 1%–3% by weight, of reactive or neutralizable halogen), precipitated silicas, and silica hydrogels or aerogels have been suggested for use as thickening agents. However, it has unexpectedly been found, in accordance with the present invention, that only the silica aerogels are suitable as starting materials for combination with ammonia to provide a product which effectively thickens an organic liquid using low concentrations of the silica material. In brief, the other silica products such as fume silicas, arc silicas, precipitated silicas and the like, are not effective thickening agents whether used alone or when treated with ammonia. It is to be noted that the term "silica material" or "silica particle," as utilized herein, is thus restricted to the silica aerogels, all of which are characterized by having the aforedefined number of silanol groups per square millimicron of the surface area.

The operative silica materials useful in the novel thickening agents are amorphus, hydrophilic, silica aerogels which readily combine with ammonia to provide the novel thickening agent products of this invention. This class of aerogels consists of finely divided solid particles of amorphus, hydrophilic, silica aerogel comprising a silica polymer having siloxy groups in addition to the aforementioned silanol groups. Such silica aerogels are usually characterized in having from about 0.1% to about 3.0% by weight of carbon, and usually contain from about 0.1% to about 3.5% by weight hydrogen; note that such ranges of hydrogen not only include any $H_2$ attached to the carbon atoms, but also include the hydrogen in the silanol groups. Stated differently, the hydrogen present in the silanol groups, i.e.,

is also included in the aforementioned percent range of hydrogen, i.e., 0.1% to 3.5%. Preferably these silica aerogels have an average particle size of from about 0.1 (or less) to about 5 microns, and a specific surface area of from about 50 to about 1000 square meters per gram.

These silica aerogels are also generally characterized by having substantially no reactive or neutralizable halogen. The only halogen present is in the form of a halogen salt such as sodium chloride, and, as such, the halogen content is less than about 0.9% by weight and may be as low as about 0.1% (or lower) by weight. Generally, the halogen content of the preferred aerogels used herein is less than about 0.5% by weight. It will be understood, then, that when reference is made to the "silica material", "silica particle" or "silica aerogel," all of these terms connote a silica aerogel which contains substantially no reactive or neutralizable halogen and that the only halogen that is present is in the form of a halogen salt or some other halogen compound which is essentially not reactive (or neutralizable with acid). It is presently believed that the presence of reactive or neutralizable halogen or combined halogen may possibly interfere with the ability of the silanol groups on the surface of said aerogel to hydrogen bond with the $NH_3$ and reduce the effectiveness of such resulting $NH_3$ coated aerogel as a thickening agent. However, this is only an idea and the applicants do not wish to be limited in any way whatsoever regarding their invention by such idea or ideas contained herein.

A particularly suitable class of organo-silica aerogel useful in the present novel thickening agents are those organo-silica aerogels which are described in the Taulli U.S. Pat. No. 3,346,507, and used in the Taulli patent U.S. 3,210,273, both of which are incorporated herein by reference. The Taulli aerogels are usually characterized in containing from about 0.4% to about 1.2% by weight of carbon (stated differently, the $SiO_2$ to carbon atom ratio is in the range of from about 10:1 to about 50:1), and from about 0.9% to about 1.5% by weight of hydrogen (stated differently, the $SiO_2$ to hydrogen atom ratio is in the range of from about 0.77:1 to about 2:1). These preferred aerogels are usually further characterized in having an average particle size of from about 1.0 to about 2.5 microns, a specific surface area of from about 100 to about 400 square meters per gram, and an external surface area of from about 1.70 to about 1.95 square meters per gram.

As previously pointed out, a wide range of silica aerogel materials may be combined, i.e., hydrogen bonded, with ammonia and subsequently incorporated in organic liquids to form the novel thickened compositions of the present invention. Table I sets forth typical analysis of some of the various aerogel materials commerically available and which can be used in combination with $NH_3$ to provide the novel thickening agent products of the present invention.

TABLE I

| Typical Analysis | Types of silica materials [1] | | | |
|---|---|---|---|---|
| | I | II | III | IV |
| Loosely packaged bulk density (lbs./cu. ft.) | 6.0 | 6.0 | 5.0 | 2.5 |
| Volatiles at 600° C., percent | 4.0 | 4.4 | 5.0 | 5.5 |
| Equivalent sodium sulfate, percent | 2.5 | 0.03 | 0.03 | 2.5 |
| pH 4% slurry at 25° C | 3.8 | 3.8 | 3.6 | 4.0 |
| Surface area (sq. meters/gm.) | 130 | 260 | 260 | 280 |
| Oil absorption (gms. oil/gm.) | 2.6 | 3.5 | 3.5 | 3.7 |
| $SiO_2$, percent | 92–94 | 94–96 | 94–96 | 90–92 |
| Absolute density (lbs./gal.) | | 17.1 | | |
| Average agglomerate size (microns) | 5.0 | 5.0 | 3.0 | 2.9 |
| Ultimate particle size (microns) | 0.01–0.02 | 0.01–0.02 | 0.01–0.02 | 0.01–0.02 |
| Silanol groups per square millimicron of silica particle surface area | 7.2 | 8.1 | 7.5 | 7.8 |
| $SiO_2$:C | 250:1–900:1 | 200:1–1,200:1 | 100:1–750:1 | 10:1–50:1 |
| $SiO_2$:H | 2.4:1–8.1:1 | 2:1–9:1 | 2.3:1–7.4:1 | 0.77:1–2:1 |

[1] Silica materials designated I through IV are different grades of silica aerogels and are commercially available under the trademark Santocel.

It is to be noted with reference to Table I that most aerogel materials listed therein (which may be used in the present invention) are prior art silica aerogels which have not been efficient as thickeners but are quite efficient thickeners in combination with minor amounts of ammonia. Such prior art silica aerogels per se were required to be used in large quantities, i.e., usually greater than 10% by weight based upon the weight of the material to be thickened. Representative of such prior art silica aerogels are those described in United States Patents 2,093,454; 2,285,449; and 2,285,477, all of these patents being incorporated herein by reference.

The $SiO_2$:C and $SiO_2$:H ratios disclosed in Table I were calculated by first converting the weight percent of $SiO_2$ in the silica aerogel and the weight percent of carbon and hydrogen in the silica aerogel to mol percentages. The $SiO_2$:C ratios were then calculated by dividing the mol percent of carbon into the mol percent of the $SiO_2$. The $SiO_2$:H ratios were calculated by dividing the mol percent of hydrogen into the mol percent of $SiO_2$.

In regard to the aforementioned silica materials, i.e., the various silica aerogels, it was also surprising to find that after treatment of said materials with ammonia, by the novel methods herein described, the resultant ammonia-coated silica (aerogel) particle still possessed substantially the same physical characteristics, for example, particle size, pore volume, specific surface area, particle diameter and the like, in addition to retaining its original amorphous and hydrophilic characteristics.

Referring now more particularly to the methods of preparing the aforementioned novel thickening agents of the present invention, it is critical that the silica aerogel such as the organo-silica aerogel hereinbefore described, be in the form of finely divided, discrete, solid particles, having a loose bulk density of less than 15 pounds per cubic foot, preferably from about 1 to about 8 lbs./ft., when contacted with the gaseous ammonia. This factor is essential in order to achieve sufficient hydrogen bonding between the silanol groups on the surface of each particle and the nitrogen atom in the ammonia molecular structure. As previously mentioned, the silica aerogel preferably should have an average particle size of from about 0.50 to about 5.0 microns; however, an average particle size of from about 1.0 to about 2.5 microns is even more desirable. While the silica aerogels described herein contain moisture or water, either molecularly bound or free, it amounts as high as 10% by weight, such materials may, if one so desires, also be utilized in the anhydrous state. However, it is preferred that such aerogels contain from about 1% to about 10% by weight water, either as free or combined water or both.

In addition to the above, if a finely divided silica aerogel is compressed, e.g., is densified or compacted to form a silica aerogel having a bulk density greater than 15 lbs. per cubic foot, and then utilized as a thickener, there is a change in chemical and/or physical characteristics of the compacted silica aerogel as contrasted to the original finely divided material. While the exact nature of such change is not known, it is known by experimentation that silica material's usefulness or effectiveness as a thickener (even after treatment with ammonia) is substantially reduced when incorporated in a liquid which one desires to be thickened.

(The undesirable results obtained by utilization of a silica-containing product, which has been compacted, treated with ammonia, and then ground to smaller particles, is demonstrated in the subsequent examples.)

While it was noted from the experimental results discussed in the paragraph set forth immediately above that a silica-containing product will not yield equivalent thickening results when said product has been compacted, treated with ammonia, and then ground into smaller particles and subsequently incorporated in a liquid material to be thickened, it has been found that silica aerogel particles having an uncompacted bulk density of less than 15 pounds per cubic foot can be treated with ammonia by the novel process of the present invention, subsequently compacted to a bulk density of not greater than about 15 pounds per cubic foot, and then utilized as a thickening agent with equivalent results as those obtained when merely using the ammonia coated, finely divided (non-compacted) silica aerogel particles. A unique aspect of the ammonia coated silica particles, which have been compacted to form a mass having a bulk density of less than 15 pounds per cubic foot, resides in the fact that such mass need not undergo a grinding operation but can be substantially incorporated and dispersed without difficulty in an organic liquid to be thickened. For example, finely divided silica aerogel particles, which have an ammonia coating thereon, may be compacted in an apparatus described and claimed in U.S. Pat. No. 3,377,945, and assigned to the assignee of the present invention, and successfully used as an effective thickening agent thereafter.

As previously mentioned, however, the finely divided silica aerogel particles, which have been treated with ammonia, also possess the same physical characteristics, i.e., particle size, specific surface area, and the like as the original or starting silica aerogel.

The second critical feature of the novel methods of preparing said thickeners, is that the process must be operated at a temperature below 150° C., preferably from about 20° C. to about 100° C. This temperature limitation is necessary in order to prevent the severance or breaking of the hydrogen bond, i.e., preventing equilibrium conditions unfavorable to the hydrogen bonding of the ammonia molecules and the silanol groups on the surface of said silica aerogel particle. As previously noted herein, hydrogen bonding can be reversed, as shown in Equation II, if the temperature of such thickening agent rises above 150° C.

The actual contacting of the finely divided silica aerogel particles and ammonia can be carried out using various gas-solid contacting techniques already known, but is preferably carried out by means of the fluidized bed technique. In the fluidized bed method of contacting the silica material with ammonia, preferably gaseous ammonia, it is desirable that the silica aerogel particles be exposed to and contacted with ammonia within a confined space (in order to achieve substantially complete hydrogen bonding and also to avoid wasting or uneconomic utilization of the ammonia gas). It has also been found desirable to utilize a gaseous media, such as air, as the carrier for the ammonia and to fluidize the bed of silica aerogel material. The most effective contacting between the ammonia and the silica (aerogel) particles is achieved in a fluidized bed when the air to silica aerogel ratio is from about 0.1 cubic feet to about 10 cubic feet, preferably from about 0.5 cubic feet to about 2 cubic feet, per 100 grams of said silica material and the air temperature is less than 150°, preferably from about 0° C. to about 100° C. and more preferably from about 20° C. to about 70° C. The amount of ammonia which is mixed with the air, which in turn is used as a carrier for said ammonia, may be used in any concentration but preferably is from about 5% to about 30% by volume of the air. Higher concentrations of ammonia may present hazards to personnel and also result in inefficient utilization of ammonia. In any event, the amount of ammonia contained in the air is generally based on the concentration of ammonia which it is desired to be coated on, i.e., hydrogen bond to the surface of, the silica aerogel material as hereinafter referred to.

Another important factor in carrying out the novel processes of this invention is the pressure conditions under which silica aerogel particles and ammonia are contacted. The pressure used during the contacting procedure is desirably between about atmospheric pressure, i.e., about 15 p.s.i.a. and about 300–500 p.s.i.a. Although pressures above 500 p.s.i.a. are not particularly advantageous, higher pressures such as, for example, 1000 or 1500 p.s.i.a. can be used, if one so desires, and are considered within the scope of the present invention. The minimum pressure employed is critical in that when the aforementioned contact reaction takes place in a relatively high vacuum, i.e., at a pressure lower than about 7 p.s.i.a., the hydrogen bond is broken and ammonia splits off from the silica particle. This breaking of the hydrogen bond is even more likely to occur when the reaction temperature is greater than 150° C., as previously noted herein.

While the process has been described in regard to the use of ammonia gas, it is also within the scope of the present invention to use liquid ammonia. In such a case, a gaseous media such as air, functioning as the $NH_3$ carrier and fluidizing means, would not be needed. In utilizing liquid $NH_3$, direct contact of such liquid with the solid silica aerogel particles is conducted in a reaction container which is constructed of materials of sufficient strength to withstand the relatively high pressures necessary to maintain ammonia in a liquified state. It is preferable, when using liquid ammonia, to place the silica aerogel particles in such a container and then add the liquid ammonia. A mechanical agitator is provided to promote efficient agitation and contact between the liquid $NH_3$ and silica particles. The reaction zone or container is maintained at a temperature less than 150° C., preferably from about 0° C. to about 100° C.; however, lower temperatures such as −10° C. to −30° C. can also be used if one so desires. After the hydrogen bonding has taken place, the ammonia can be vented, recompressed and subsequently reused.

In the utilization of both the liquid and gaseous ammonia, the hydrogen bonding with the silanol groups of the silica aerogel particles generally occurs instantaneously (that is, the bonding is a first order rate reaction). However, it is desirable to have a contact time of at least one minute, and preferably from about 3 minutes to about 30 minutes, this latter time period being particularly desirable when the contact is conducted in a fluidized bed manner.

In a preferred embodiment of the present invention, the novel thickening agent may be prepared by contacting a fluidized bed of finely divided solid particles of an amorphous, hydrophilic organo-silica aerogel, having less than about 0.5% by weight unreactive halogen and comprising a silica polymer having siloxy groups and having from about 4 to about 12 silanol groups per square millimicron of surface area, with a gaseous ammonia-containing air atmosphere at substantially atmospheric pressure in a confined space which is maintained at a temperature less than 150° C., preferably from about 20° C. to about 70° C. The organo-silica aerogel used is characterized in having an average particle size of between about 1.0 and 2.5 microns, a specific surface area of from about 100 to about 400 square meters per gram, and an external surface area of from about 1.70 to 1.95 square meters per gram. Furthermore, such aerogel contains from about 0.4% to about 1.2% by weight carbon and from about 0.9% to about 1.5% by weight hydrogen chemically bound to a portion of the siloxy groups. The amount of ammonia contacted with this aerogel is an amount sufficient to provide a coating, i.e., hydrogen bonding, on said aerogel of from about 0.1% to about 2.0% by weight ammonia. The ammonia-containing air atmosphere is injected into a bed of such silica particles so as to maintain the particles in a fluidized state. The atmosphere (air) to ammonia ratio is from about .5 to about 2 cubic feet, per 100 grams of said aerogel, and the contact time between the ammonia-containing atmosphere and said aerogel is from about 3 minutes to about 30 minutes.

Another embodiment of the present invention relates to novel compositions which comprise a mixture of (a) an organic liquid; and (b) the solid reaction product of ammonia and a silica aerogel material (as hereinbefore described), i.e., the novel ammonia-coated silica (particles) material, in which the silica aerogel material has a specific surface area of at least 50 square meters per gram and at least one silanol group per one square millimicron of surface area and the nitrogen atom in the ammonia molecular structure is hydrogen bonded (also known as "hydrogen bridge" or "hydroxyl bonded") to the hydroxyl portion of such silanol group.

The organic liquids which may be thickened with the novel silica materials of this invention to form thickened compositions are exemplified by liquids such as liquid organic resins, organic solvents, liquid organic film-formers, oleagineous liquids, mixtures thereof, and the like. Generally these organic liquids per se have a viscosity in the range of from about 2.5 millipoises to about 4,000 centipoises at a temperature of about 25° C.

As stated above, the silica material, i.e., aerogel, treated with ammonia, may be employed in compositions comprising any of the hereindescribed organic liquids to thicken, i.e., render thixotropic, and/or increase the viscosity of such liquids to a greater degree than when employing equal weights of the prior art silica products per se (that is, the silica aerogel material or other silica products which have not been treated with ammonia).

The term "thixotropic" is used herein to denote the property of certain organic liquids, containing the thickening agent (i.e., an aerogel treated with ammonia), to thicken and to change rapidly, on standing, from a liquid into a gel-like solid mass or body having sufficient cohesive strength to withstand distortion by gravitational force when suspended freely in an inverted receptacle or on a coated object. The gel is also of such a nature that it can be fluidized by the application of mechanical agitation as by shaking, stirring, vibrating, and the like. The property of thixotropy as understood herein is thus characterized by a reversible isothermal sol⇌gel transition.

Classes of organic liquids having a relatively low viscosity, e.g., in the range of from about 2.5 to 25 millipoises at 25° C. can be employed in combination with the ammonia treated silcia material (thickening agent) to provide compositions having a viscosity appreciably above 25 millipoises and up to 500 or more centipoises at such temperature. Such organic liquids may be organic solvents, for example, solvents used in paint, varnish or lacquer removers, and include liquids such as aliphatic and aromatic alcohols, ketones, and esters, for example, ethanol, acetone, methyl ethyl ketone, ethyl acetate, amyl acetate and the like.

Also classes of organic liquids having relatively higher viscosities, e.g., viscosities ranging from about 100 to 600 centipoises at 25° C., can be used with the ammonia treated silica material to provide compositions having viscosities of from 1,000 to 8,000 (or more) centipoises measured at 25° C. Such organic liquids include classes of oleaginous liquids such as oils of animal and vegetable origin, for example, cod liver oil, olive oil, corn oil, and the like. Also included in the oleaginous liquids are lubricating oils such as hydrocarbon motor oils and these may be employed with such material to provide gel-like bodies having a grease consistency. Furthermore, mixtures of the aforementioned oils may be thickened by the practice of the present invention.

Other classes of organic liquids which may be thickened and/or rendered thixotropic include organic film-formers, i.e., film-forming organic liquids, such as liquids containing a dissolved organic film-forming, or bonding, solid or liquid which, on evaporation of such liquid or by polymerization during or after evaporation of such organic liquid, forms films, coatings, or a binder which is capable of bonding two similar (e.g., glass fibers) or two dissimilar materials with a relatively high strength bond.

For example, liquid coating compositions comprising solutions of high molecular weight film-formers dissolved in organic solvents may be thickened by dispersing in the solution from about 0.05% to about 2.0% by weight, based on the weight of the solution, of a silica aerogel coated with as little as 0.01% by weight of ammonia, based on the weight of the aerogel. Also, certain organic liquid polymers may be made thixotropic by dispersing therein from about 0.05% to about 3.0% by weight, based on the weight of the composition, of a silica aerogel coated with from about 0.20% to about 2.5% by weight, based on the weight of the aerogel, of ammonia. Such compositions are generally employed as adhesives, films, foils, lacquers, paints, stretching lacquers (dopes) and the like and comprise solutions or suspensions of high molecular weight organic film-formers such as, for example, nitrocellulose, cellulose acetate, chlorinated rubber, polyvinyl acetate, polyvinyl chloride, polyacrylic esters, cellulose butyrate, cellulose propionate, and the like, which are dissolved or suspended as fine particles in organic solvents or liquids such as, for example, acetone, ethanol, ethyl acetate, amyl acetate, dioctyl phthalate, etc.

The above organic film-forming compositions usually contain from about 40% to 50% by weight of film-formers dissolved or suspended in an organic solvent or liquid and may often have a dispersed phase consisting essentially of pigments or fillers. Where it is desired that the above-described liquid compositions be applied to objects in the form of a spray or spreadable liquid, the addition of from about 0.05% to 3% by weight (depending upon the amount of film-forming materials in the composition) of the silica materials coated with from about 0.10% to about 2.0-2.5% by weight of ammonia (based on the weight of the silica) to such compositions will cause the formation of a thixotropic gel composition almost immediately on contact with the object to which they are applied and such gel composition will then not significantly or appreciably run or drain from such objects.

Among the liquid organic resin compositions referred to above which may be employed with the siilca aerogels treated with ammonia as particularly useful composition embodiments of this invention are plastisol compositions comprising halogenated vinyl or vinylidene resins such as, for example, an emulsion polymerized polyvinyl chloride polymer suspended in a plasticizer such as a phthalate ester, for example, dioctyl phthalate, dibutyl phthalate, dihexyl phthalate, ethyl hexyl phthalate and the like, in which the plasticizer chosen is a plasticizer for the resin employed. Such plastisol compositions are described in U.S. Patent 2,852,482, issued Sept. 16, 1958, to Paul R. Graham, and U.S. Patent 2,885,378, issued May 5, 1959, to Joseph R. Darby. Since plastisol compositions are used for forming films or coating molds, they must be liquid or at least have some degree of fluidity (that is, flow characteristics). However, when in the liquid state, the halogenated vinyl or vinylidene resin particles and fillers or pigments, which fillers or pigments are often incorporated in such compositions, tend to settle out and render the plastisol composition non-homogeneous and unsuitable for film-forming purposes. It has presently been found that the addition of from 0.05% to 5.0%, preferably from 0.25% to 3.0%, by weight of the aforementioned silica aerogels which are coated with from about 0.10% to about 2.0-2.5% by weight of ammonia to such composition will suitably thicken the composition to the point where such composition will overcome the aforementioned problems.

It has also been found possible to thicken and/or render thixotropic, polymerizable organic liquid compositions comprising polymerizable resins, including solventless varnishes and polyester resin compositions, which are used in coating, filling, adhesive, and laminating operations by incorporating small amounts of the ammonia-treated silica aerogel therein. Such compositions include liquid alkyd resins or solutions of solid alkyd or polyester resins dispersed in a solvent (for example, styrene) which is usually copolymerizable with the polyester resin.

Other organic resin liquids which may be employed in combination with the (ammonia-treated silica material) novel thickening agent in a preferred embodiment of this invention are polymerizable liquids comprising unsaturated alkyd resins. These resins are the reaction products of (i) polyhydric alcohols, mixtures of polyhydric alcohols or mixtures of polyhydric and monohydric alcohols, and (ii) an alpha unsaturated alpha, beta carboxylic acid, or a plurality of polycarboxylic acids one of which at least is an unsaturated polycarboxylic acid. Examples of such polyhydric alcohols are ethylene glycol, di- and triethylene glycol, propylene glycol, tetramethylene glycol, glycerine or pentaerithrytol in combination with a monohydric alcohol, etc. Examples of unsaturated polycarboxylic acids are maleic, fumaric and itaconic acids. The term polycarboxylic acid as used herein is intended to include within its meaning the anhydrides of such acids which may also be employed. In addition to one or more of the unsaturated polycarboxylic acids, saturated polycarboxylic acids may also be present in the reaction mixture referred to above. Examples of such saturated polycarboxylic acids are succinic, adipic, sebacic, phthalic and terphthalic acids. The anhydrides of such acids may also be used instead of the acids or in combination therewith.

It has also been discovered that incorporating the novel thickening agent of this invention in a polyhydric alcohol per se (which falls within the general class of organic solvents), i.e., without any polymerization or reaction with other materials, consequently results in an alcohol having a greatly increased viscosity and being more thixotropic.

Instead of the above described unsaturated alkyd resins, the polymerizable liquids which may be used in the compositions of the present invention may contain polymerizable substance such as, for example, esters of monohydric alcohols and polycarboxylic acids, including unsaturated polycarboxylic acids, halogenated aromatic polycarboxylic acids and polybasic inorganic acids. Examples of such substances are dialkyl maleate, dialkyl fumarate, dialkyl itaconate, and the like. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate, dibenzyl fumarate, and the like.

The above-described unsaturated resins may be liquids, or solids dissolved in organic liquids, and the thickening agent may be directly dispersed in the liquids. When the unsaturated resin is a solid, it is necessary to dissolve the resin in an organic solvent, preferably a solvent which is copolymerizable with the polyester resin, such as, for example, styrene or other liquid copolymerizable monomers.

There may also be incorporated in the above-described polymerizable liquid compositions containing the thickening agent of this invention, small amounts ranging from about 0.5% to 2.0% by weight, based on the weight of the polymerizable liquid, of a polymerization catalyst.

Many types of polymerization catalysts, well known to those skilled in the art, may be incorporated in the polymerizable liquid compositions of this invention including, for example, benzoyl peroxide, methyl ethyl ketone peroxide, cyclo-hexane peroxide, and cumene hydroperoxide, which provide the oxygen necessary to effect polymerization.

Additional organic resin liquids which may be thickened and/or rendered thixotropic include the well known epoxy resins; that is, resins based on ethylene oxide or its homologues or derivatives. The epoxy resins may be condensation polymers of epichlorohydrin and (a) bisphenol A [2,2-bis'(p-hydroxyphenyl)-propane,

(b) ethylene glycol, (c) glycerol, and/or (d) related hydroxyl-containing compounds, and have both epoxide

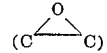

and hydroxyl groups, which are capable of further reaction with various modifiers or curing agents. These resins are usually pale amber in color and range from viscous liquids to brittle solids with softening points varying from 40° C. to 150° C. Several epoxy resins which are suitable for use in conjunction with the novel thickening agents of the present invention are commercially available under the trademarks Araldite, Bakelite, Epi-Rez, C–8, Devron, and Epon. Those epoxy resins which are liquid may be thickened as in the case of the other organic liquids described above. However, if the resins are in solid form, then such resin may be dissolved and/or dispersed in a solvent and the resultant liquid resin-solvent mixture may be thickened by the practice of the present invention. Furthermore, these liquid resin combinations may be utilized with suitable curing agents which are well known in the plastic art; for example, curing agents which may be mentioned include organic bases such as amines, acid anhydrides, and compounds containing active hydrogen.

A particularly useful embodiment of the present invention comprises organic thixotropic compositions comprising natural and/or synthetic polymers (i.e., organic resins) dissolved in a liquid medium and thickened with the ammonia-treated silica materials.

In a still further preferred embodiment of the present invention there is provided a composition of matter consisting essentially of (a) a polymerizable liquid containing styrene and an organic polyester resin, and (b) finely divided solid particles of an amorphous, hydrophilic organo-silica aerogel having less than 0.5% by weight unreactive or non-neutralizable halogen, and comprising a silica polymer having siloxy groups and having from about 4 to about 12 silanol groups per square millimicron of surface area, coated with ammonia which is present in a concentration of from about 0.10% to about 2.0% by weight, based on the weight of the silica aerogel. The aerogel and ammonia are further characterized by having hydrogen bonding between the hydroxy portion of the silanol groups on the surface of such aerogel particles and the nitrogen atoms of the ammonia. Such organo-silica aerogel is still further characterized in having a water content of from about 1% to about 10% by weight, based on the weight of said aerogel, an average particle size of between about 1.0 and 2.5 microns, a specific surface area of from about 100 to 400 square meters per gram, and an external surface area of from about 1.70 to 1.95 square meters per gram; and contains from about 0.4% to about 1.5% by weight of hydrogen chemically bonded to a portion of the siloxy groups. The aerogel is used in an amount of from about 0.05% to about 6.0% based on the weight of the polymerizable liquid.

A further understanding of the processes and compositions of the present invention will be obtained from the following examples which are intended to illustrate the invention but not to limit the scope thereof, parts and percentages being by weight unless otherwise specified.

EXAMPLE I

A novel thickening agent of the present invention was prepared in the following manner using the subsequently described apparatus. A cylindrical vessel or container having a one hundred ten (110) gallon capacity, a height of 8 feet, and a diameter of 2 feet was so adapted, as described below, to permit the feeding of gaseous media and solids thereinto and the exit of the gas per se therefrom during the operation thereof. Such container provided a confined area in which the silica material was coated with ammonia in a fluidized bed contact manner. Specifically, a one inch (I.D.) glass tube, which was approximately 2½ feet long, was positioned vertically in the top (substantially the center) of the container so that the lowermost portion of the tube opened into the container. This 1″ I.D. tube was used to supply the container with the silica material. The upper portion of such tube was provided with two additional glass tubes (not connected to each other) somewhat inclined from the vertical, each of such additional tubes having a 3/16″ I.D. and being about 12 inches long with the lowermost portion opening into the aforesaid 1″ glass tube. The uppermost glass tube (3/16″ I.D.) was used to supply gaseous ammonia whereas the lowermost glass tube (3/16″ I.D.) was used to supply air to the 1″ tube.

The container was also provided with an additional 1″ I.D. vertically positioned tube (spaced about 0.75 foot from the centrally located tube) to permit the escape of gases from such container. This additional 1″ I.D. tube had a cloth bag filter attached to the top end of the tube. This bag filter functioned to collect any of the entrained silica solid materials contained in the gases exiting from the container through such 1″ I.D. tube.

In the actual operation of the above described apparatus, approximately 284 grams of finely divided, solid particles of a silica aerogel were fed over a period of 4 minutes at a rate of 71 grams per minute into the top portion of the 1″ I.D.–2½′ long glass tube. Such aerogel was produced by the process set forth in the first three paragraphs of Example I of the Taulli U.S. Pat. No. 3,346,507 and was characterized by being amorphous, hydrophilic, containing about 0.2% by weight of unreactive halogen, and having a $SiO_2:C$ atom of about 15:1 (1.19% by weight carbon) and an $SiO_2:H$ atom ratio of about 1.1:1 (1.39% by weight hydrogen). This aerogel was further characterized in having about 3% water, mostly combined water, a loose bulk density of about 3.0 pounds per cubic foot, an average particle size of 2.4 microns, an external surface area of 1.88 square meters per gram, approximately 7.6 silanol groups per square millimicron of particle surface area, and a specific surface area of 275 square meters per gram. This aerogel falls within the category of the Type IV aerogel disclosed in Table I hereinbefore set forth.

Concurrently and during the same time that the foregoing described aerogel was fed into the container via the 1″ I.D. x 2½′ glass tube, 0.0735 gram NH$_3$ per minute and 0.9 (total) cubic feet of air per minute were separately injected into the 3/16″ x 12″ glass tubes referred to above. The ammonia-containing air facilitated the creation of a fluidized bed in the aforementioned container wherein the aerogel was "coated," i.e. bonded, with NH$_3$, thereby creating a pressure of about 20 p.s.i.a. in such container.

The air to aerogel ratio was 1.27 ft.$^3$/100 grams during the 4 minute aerogel feed time. The air utilized was about 0.6 cubic feet per minute at a temperature of 61° C. through the 3/16″ x 12″ glass tube, plus about 0.3 cubic foot per minute at a temperature of 61° C. through the 3/16″ x 12″ glass tube, plus about 0.3 cubic foot per minute at 25° C. which was sucked in from the atmosphere due to the jet action created in the 1″ x 2½′ glass tube into which the silica aerogel was being fed. Prior to feeding the ammonia, air, and silica aerogel concurrently into the aforementioned glass tubes, the ammonia flow was started for approximately two minutes in order to attain some ammonia concentration in the container or cylindrical vessel. As previously mentioned, the aerogel was fluidized and concurrently coated with ammonia in the container by the above process. The ammonia treated or coated silica aerogel product which had an ammonia concentration of 0.10% by weight, based upon the weight of said silica, was then transferred to a polyethylene bag in which it was stored in order to be subsequently used for the thickening tests hereinafter described. A sample of the ammonia-coated aerogel was analyzed and found to have substantially the same physical characteristics as the starting silica aerogel per se, i.e., the silica aerogel material supplied to the 1″ I.D.–2½ ft. tube prior to contact. (The amount of hydrogen present in the coated aerogel, however, was increased due to the presence of the hydrogen bonded NH$_3$ atoms.)

The above procedure was then repeated in order to prepare ammonia treated silica aerogels containing different ammonia concentrations. Specifically, the ammonia utilized per unit period of time was changed from 0.0735 gram per minute to 0.184 gram per minute, 0.735 gram per minute, and 1.470 gram per minute, respectively, in order to produce silica particles containing .25%, 1.00%, and 2.00% by weight of ammonia, respectively, based on the weight of the silica aerogel. In each case where the ammonia utilized per unit of time was changed, the amount of silica aerogel treated was 284 grams and the total air utilized per unit of time was still 0.9 cubic feet per minute.

Samples of the above-described ammonia treated aerogel product and the aerogel per se (i.e., without ammonia treatment) were then subjected to infrared spectroscopic investigation in order to determine whether hydrogen bonding did exist with the partially ionized hydrogen atoms of the surface hydroxyls on the silica (i.e., silanol groups) and the unshared electron pairs of their nitrogen atoms (in the ammonia molecular structure). The results of this investigation disclosed that in conformity with the curve showing the variation of the concentration of the silica surface hydroxyls, the spectrum showed the free hydroxyl absorption band (i.e., silica aerogel with no ammonia treatment) at 3750$^{-1}$ cm., with a section gently sloping in the direction of low frequencies due to the superposition of the band associated with the residual intraglobular hydroxyls. (The graph used had the transmittance on the vertical axis with the absorption values on the horizontal axis, the left hand side having the largest number, i.e., 3800 cm.$^{-4}$ and progressing to the right hand side which had the smallest number, e.g., 2500 cm.$^{-4}$). In the case of the ammonia treated-silica aerogel, however, this free hydroxyl absorption band of 3750$^{-1}$ cm. was greatly reduced in intensity and gave rise to a broad band at about 3000$^{-1}$ cm. associated with hydroxyls perturbed by the absorption of ammonia, and bands due to the absorbed ammonia itself. Thus, it can be concluded that the change in the spectrum of the aerogel hydroxyls on absorption of or contact with ammonia and in the spectrum of the absorbed ammonia molecules themselves, indicates the formation of a hydrogen bond between the partially ionized hydrogen of the surface hydroxyls (i.e., silanol groups) on the silica aerogel material and the unshared electrons of the nitrogen atoms in the NH$_3$ groups.

The spectroscopic studies set forth immediately above are the results of the averages of about 5 samples of each silica aerogel material, i.e., ammonia treated and untreated samples.

Samples of the above-described ammonia treated-aerogels were also tested for stability, i.e., the percent loss of NH$_3$ from such aerogel stored for a period of time under certain conditions. These samples were stored in closed glass containers for a period of two months at room temperature, i.e., about 20° C. At the end of this time, the samples were analyzed for ammonia content and it was found that such ammonia-coated aerogels were substantially stable in that only from about 10% to about 25%, by weight, of the NH$_3$ was lost over the aforementioned period.

EXAMPLE II

The above procedure initially set forth in Example I was again repeated utilizing 284 grams of an amorphous, hydrophilic, finely divided silica aerogel which had an unreactive halogen content of 0.10% by weight and, which was prepared according to the procedure described in the next to the last paragraph in Example I of the aforementioned Taulli U.S. Pat. No. 3,346,507. The silica aerogel so prepared contained traces (e.g., 0.05% by weight) of carbon, 0.057% by weight of hydrogen and had a SiO$_2$:C ratio of 350:1 and a SiO$_2$:H ratio of 3:1. This aerogel was further characterized in having about 3.8% water, an average particle size of 2.6 microns, a specific surface area of 135 square meters per gram, an external surface area of 0.75 square meters per gram, a total pore volume of 730 milliliters per gram, a loose bulk density of approximately 6.0 pounds per cubic foot and contained approximately 7.0 silanol groups per square millimicron of particle surface area. Such aerogel falls within the category of the Type I aerogel disclosed in Table I hereinbefore set forth.

The first batch of 284 grams of such silica aerogel was treated with ammonia at a rate of 0.0735 gram per minute in order to provide an ammonia concentration of 0.10% by weight, based upon the weight of the silica aerogel. Another 284 grams of the same starting silica aerogel were treated with ammonia at a rate of 0.184 gram per minute in order to yield a silica product having an ammonia concentration of .25% by weight. These two batches of ammonia-treated silica aerogel were also stored in polyethylene bags for further use in the examples hereinafter set forth.

A sample of the above prepared ammonia-coated aerogel was analyzed and found to have substantially the same characteristics, such as being amorphous and hydrophilic, heretofore set forth regarding the starting aerogel per se, i.e., without the ammonia coating. (The amount of hydrogen present in the coated aerogel was increased, however, due to the presence of the hydrogen bonded NH$_3$ atoms.)

EXAMPLE III

The procedure initially set forth in Example I was again repeated utilizing a finely divided silica aerogel (having an unreactive halogen content of 0.12% by weight) falling within the category of the Type II aerogel described in Table I hereinbefore referred to. Specifically, this aerogel had a SiO$_2$:C atom ratio of 350:1 (0.05% by weight carbon), a SiO$_2$:H atom ratio of 3:1 (0.051% by weight hydrogen), an average particle size of 3.4 microns, a specific surface area of 261 square meters per gram, an external surface area of 0.86 square meter per gram, a total pore volume of 810 milliliters per gram, a loose bulk density of approximately 6.0 pounds per cubic foot, a water content of about 2.4%, and about 8 silanol groups per square milimicron of particle surface area. Approximately 284 grams of said silica aerogel were treated with ammonia which was injected at a rate of 0.184 grams per minute and which yielded an ammonia coated-silica aerogel product having an ammonia concentration of about 0.25% by weight, based upon the weight of said aerogel. This process was also carried out under the same conditions as initially set forth heretofore in Example I. The treated silica material was also stored in a polyethylene bag in order to be used in the examples hereinafter set forth.

A sample of the above prepared ammonia-coated aerogel was analyzed and found to have substantially the same characteristics, such as being amorphous and hydrophilic, heretofore set forth regarding the starting aerogel per se, i.e., without the ammonia coating. (The amount of hydrogen present in the coated aerogel was increased, however, due to the presence of the hydrogen bonded $NH_3$ atoms.)

mixer. The properties of the resultant compositions are summarized in Table II.

After mixing, the viscosities of each of the compositions were then measured at 25° C. by a model RVT Brookfield Viscosimeter using a TA Spindle at 20 r.p.m., 10 r.p.m., and 5 r.p.m. The values obtained from these measurements are shown in Table II.

From the foregoing, it will be noted that not all of the compositions contained ammonia treated silica materials. This particular point is made in order to show the sharp contrast between (1) organic liquids thickened with the thickening agent of the present invention which constitutes the silica aerogel in combination with ammonia and (2) organic liquids thickened with the silica aerogel per se (i.e., containing no ammonia) which have been suggested as thickening agents by the prior art.

TABLE II

| Composition | Type silica | Silica wt. percent used [1] | Ammonia [2] concentration | Viscosity in centipoises at 25° C., Brookfield RVT Helipath, TA spindle | | | Thixotropy index [3] |
|---|---|---|---|---|---|---|---|
| | | | | 20 r.p.m. | 10 r.p.m. | 5 r.p.m. | |
| Liquid styrene polyester resin | None | 0 | 0 | 760 | 780 | 720 | |
| Do | Aerogel [4] | 2 | 0 | 1,500 | 1,600 | 1,760 | 1.17 |
| Do | do | 2 | .10 | 2,270 | 2,800 | 3,540 | 1.56 |
| Do | do | 2 | .25 | 2,380 | 3,020 | 3,800 | 1.66 |
| Do | do | 2 | 1.00 | 2,690 | 3,470 | 4,560 | 1.70 |
| Do | do | 2 | 2.00 | 3,780 | 3,580 | [5] 4,870 | [5] 1.75 |
| Do | do [6] | 2 | 0 | 1,490 | 1,600 | 1,760 | 1.18 |
| Do | do [6] | 2 | 0.25 | 1,950 | 2,320 | 2,980 | 1.53 |

[1] Based on the weight of the composition, e.g., 2 parts $SiO_2$/98 parts composition.
[2] Based on parts ammonia/100 parts of silica used.
[3] Thixotropy index = $\frac{\text{viscosity at 5 r.p.m.}}{\text{viscosity at 20 r.p.m.}}$
[4] Silica Type IV of Table I (used in Example I).
[5] Higher numerical value for viscosity and thixotropy indicates greater effectiveness.
[6] Silica Type I of Table I (used in Example II); similar viscosity values were obtained for Type II, Table I aerogel (used in Example III).

EXAMPLE IV

The unique thickening properties of the present invention thickening agent (i.e., the ammonia-treated silica aerogel materials, for example, prepared by the procedures set forth in the above Examples I through III, when incorporated in various organic liquids and the resultant increase in viscosity and/or thixotropy), is illustrated in the following description.

The organic liquid to be thickened with the hereinafter described thickening agent contained 40 parts of styrene in which were dissolved 60 parts of an unsaturated polyester resin. This resin was prepared by reacting 50 mol percent of phthalic anhydride and 50 mol percent of maleic anhydride with a 25% molar excess of propylene glycol, which excess of propylene glycol was thereafter distilled off leaving a solid, hard, brittle, unsaturated polyester resin.

To approximately 245-gram separate portions of the liquid styrene-polyester resin composition described in the preceding paragraph, there were separately added, in the manner hereinafter described, (a) 5 grams each of the ammonia-treated silica materials prepared by the procedures set forth in Examples I–III and having various concentrations of ammonia thereon; and (b) 5 grams of each of the aerogels per se, that is, not treated with ammonia. Specifically, the ammonia-treated silica materials and aerogels per se, were all mechanically dispersed separately into separate (but identical) liquid resin compositions by mixing the materials together for a 4-minute period in an Eppenbach (high shear) dispersion The results set forth in Table II were obtained on the same batch of polyester resin. Since there is some variance in properties in a particular polyester resin from batch to batch, the results, i.e., viscosity values, from different batches of polyester resin may not be the same as those given in Table II. Nevertheless, the order of magnitude differences for a particular batch of polyester resin will be somewhat comparable to those shown in Table II. Another factor which also has an effect on viscosity values of the polyester resin (and also other liquids) is the method of dispersing the silica aerogel in said resin. Specifically, it has been observed that the utilization of a high shear dispersion technique, for example—the above-described Eppenbach dispersion mixer, will generally result in lower viscosity values as contrasted to using a low shear dispersion technique for example—manually dispersing the material in the liquid, which results in substantially higher viscosity values.

It can readily be seen then, from the data set forth in Table II, that the utilization of the novel thickening agent of the present invention in a polymerizable organic liquid provides a substantial increase in viscosity and in thixotropy of such liquid as contrasted to the results obtained by the use of the silica aerogel materials per se (non-ammonia treated) in such organic liquids, and which latter materials are representative of prior art compositions.

EXAMPLE V

Table III illustrates the results obtained by the utilization of (1) the silica materials prepared by the procedures set forth in the above Examples I and II, i.e., the present invention thickening agents and (2) organo-silica aerogels per se (i.e., with no ammonia treatment) in a plastisol composition which was prepared by suspending fine particles of a polyvinyl chloride polymer (obtained by emulsion polymerization) in dioctyl phthalate which contained dibasic lead phosphonite, said phosphonite being employed as a stabilizer to prevent decomposition during the heating of the plastisol.

To approximately 245 grams separate portions of the above referred to plastisol compositions, there were separately added (a) 5 grams each of the ammonia treated silica materials of Examples I and II having various concentrations of ammonia thereon; and (b) 5 grams of the aerogels per se. The ammonia-treated silica aerogel materials and aerogels per se were separately added to and mechanically dispersed in the separate plastisol compositions by mixing the materials together for a 2-minute period in a Waring blender which provided a high shear dispersion. After mixing, the viscosity of each of the compositions was then measured at 25° C. by a Model LVT Brookfield Viscosimeter using a TA Spindle at 20 r.p.m., 10 r.p.m., and 5 r.p.m. The values obtained from these measurements are shown in Table III.

It can readily be seen from the values obtained from the viscosimeter readings that the novel thickened liquid compositions containing the novel thickening agent, i.e., the ammonia treated organo-silica aerogels, are superior, i.e., have higher viscosity readings, to the compositions containing only the organo-silica aerogel per se, which aerogel per se represents the thickening agent used in the prior art compositions as exemplified by the Taulli patent, U.S. 3,210,273.

butyl acetate, N-butyl alcohols, mineral spirits, and mineral oil, and (b) distilled water. Also shown in Table IV are the results of the utilization of said aerogel per se (i.e., not containing any ammonia) in the aforementioned liquids in order to illustrate the difference in thickening properties of the prior art compositions and the novel thickening agents or compositions of the present invention. The present invention thickening agents individually and separately used in this Example VI were prepared by the respective procedures described in the above Examples I and II. The prior art thickening agents, the Type I-Table I aerogel per se (i.e., starting aerogel of Example I) and the present invention thickening agents of Examples I and II were individually then mechanically dispersed in separate but equal portions of the separate aforementioned liquids by means of mixing the materials together for a 2-minute period in a Waring (high shear dispersion) blender. After mixing, the viscosity of each of the compositions was then measured at 25° C. by a Model LVT Brookfield Viscosimeter using a TA Spindle at 20 r.p.m., 10 r.p.m., and 5 r.p.m. The values obtained from these measurements are shown in Table IV.

It can readily be seen then from the data set forth in Table IV that the utilization of the thickening agents of the present invention results in a substantial increase in

TABLE III

| Composition | Type silica | Silica wt. percent used [1] | Ammonia concentration [2] | Viscosity in centipoises at 25° C., Brookfield LVT Helipath, TA spindle | | | Thixotropy index [3] |
|---|---|---|---|---|---|---|---|
| | | | | 20 r.p.m. | 10 r.p.m. | 5 r.p.m. | |
| Polyvinyl chloride-dioctyl phthalate | None | 0 | 0 | 55 | 55 | 55 | |
| Do | Aerogel [4] | 2 | 0 | 730 | 1,040 | 1,460 | 1.98 |
| Do | do [4] | 2 | 0.10 | 1,260 | 1,940 | 3,080 | 2.45 |
| Do | do [4] | 2 | 0.25 | 2,100 | 3,820 | 5,400 | 2.58 |
| Do | do [5] | 2 | 0 | 1,090 | 1,560 | 2,310 | 2.12 |
| Do | do [5] | 2 | 0.25 | 2,190 | 3,470 | [6] 5,590 | [6] 2.68 |

[1] Based on the weight of the composition, e.g., 1 part $SiO_2$/98 parts composition.
[2] Based on parts of ammonia per 100 parts of silica used.
[3] Thixotropy index = $\frac{\text{viscosity at 5 r.p.m.}}{\text{viscosity at 20 r.p.m.}}$
[4] Silica Type IV of Table I (used in Example I).
[5] Silica Type I of Table I (used in Example II).
[6] Higher numerical value for viscosity indicates greater effectiveness.

EXAMPLE VI

Table IV illustrates the results obtained by the utilization of organo-silica aerogels combined with ammonia in (a) four different types of organic liquids, i.e., N- viscosity and in thixotropy when incorporated in various liquids, particularly organic liquids, as contrasted to the utilization of the silica aerogels per se (i.e., without any ammonia treatment) in such liquids as in the prior art compositions.

TABLE IV

| Composition | Type silica | Silica wt. percent used [1] | Ammonia concentration [2] | Viscosity in centipoises at 25° C., Brookfield LVT Helipath, TA spindle | | | Thixotropy index [3] |
|---|---|---|---|---|---|---|---|
| | | | | 20 r.p.m. | 10 r.p.m. | 5 r.p.m. | |
| N-butyl acetate | None | 0 | 0 | | | | |
| Do | Aerogel [4] | 5 | 0 | [5] 9 | [5] 10 | [5] 10 | 1.11 |
| Do | do [4] | 3.2 | 0.25 | 1,260 | 2,400 | 4,680 | 3.71 |
| Do | do [6] | 3.2 | 0 | 10 | 11 | 11 | 1.10 |
| Do | do [6] | 3.2 | 0.25 | 390 | 700 | 1,160 | 2.97 |
| N-butyl alcohol | None | 0 | 0 | | | | |
| Do | Aerogel [4] | 5 | 0 | [5] 12 | [5] 10 | [5] 10 | .834 |
| Do | do [4] | 4 | 0.25 | 340 | 580 | 960 | 2.82 |
| Distilled water | None | 0 | 0 | | | | |
| Do | Aerogel [4] | 4 | 0 | [5] 5 | | [5] 5 | 1.00 |
| Do | do [4] | 4 | 1 | 820 | 1,540 | 2,760 | 3.36 |
| Mineral spirits | None | 0 | 0 | | | | |
| Do | Aerogel [4] | 3 | 0 | 1,160 | 2,380 | 3,800 | 3.28 |
| Do | do [4] | 3 | 0.25 | [7] 2,110 | [7] 4,020 | [7] 8,000 | 3.78 |
| Do | do [6] | 3 | 0 | 700 | 1,380 | 2,160 | 3.08 |
| Do | do [6] | 3 | 0.25 | 1,100 | 2,000 | 4,000 | 3.63 |
| Mineral oil [8] | None | 0 | 0 | [5] 137 | [5] 137 | [5] 137 | 1.00 |
| Do [8] | Aerogel [4] | 1.5 | 0 | 1,650 | 2,380 | 3,520 | 2.13 |
| Do [8] | do [4] | 1.5 | 0.25 | 1,820 | 2,620 | 4,000 | 2.21 |

[1] Based on the weight of the composition, e.g., 2 parts $S_2O$/98 parts composition.
[2] Based on parts of ammonia/100 parts of silica used.
[3] Thixotropy index = $\frac{\text{viscosity at 5 r.p.m.}}{\text{viscosity at 20 r.p.m.}}$
[4] Silica Type IV of Table I (used in Example I).
[5] No. 1 spindle at 60, 30, and 12 r.p.m. instead of 20, 10, and 5 r.p.m.
[6] Silica Type I of Table I (used on Example II).
[7] Higher numerical value for viscosity and thixotropy indicates greater effectiveness.
[8] Commercially available under the trade name Nujol.

EXAMPLE VII

Table V illustrates the results of the utilization of the following materials in a liquid epoxy resin which was prepared by the condensation of epichlorohydrin with bisphenol A which resin is commercially available under the trademark Epon 815:

(a) A thickening agent prepared by the procedure set forth in the above-described Example I (third paragraph), i.e., the Type IV (Table I) silica aerogel coated with 0.25% by weight ammonia, and (b) Organo-silica aerogel per se.

The above present invention thickening agents (a), and the aerogel per se (b), were all dispersed in separate but equal portions of the liquid epoxy resin composition by the same technique as set forth in Example IV. The viscosity measurements were conducted at 25° C. on a model RVT Brookfield Viscosimeter using a TA Spindle rotated at 20 r.p.m. and at 5 r.p.m. In this example (VII), the liquid epoxy resin compositions were aged for 24 hours at 25° C. after which time the viscosity of each composition was determined. It can readily be seen from the values set forth in Table V that the liquid epoxy resins containing the present invention thickening agent, i.e., the ammonia-treated organo-silica aerogel (a), were superior, i.e., had higher viscosity readings, to the compositions which contained only the silica aerogel per se (b), i.e., with no ammonia treatment.

ammonia concentration; this silica had approximately 8 silanol or

groups present.

The precipitated silica used herein had the following properties:

Form—ultra fine white powder
Ultimate particle size, Mu—13
pH—8.5
Surface Area (square meters per gram)—300
Oil adsorption (grams oil/gram)—2.50
Bulk Density as loosely packaged, lbs./cu. ft.—4
$SiO_2$%—97
Sulfates as $SO_3$, percent—0.6

To approximately 245-gram separate portions of (1) the liquid styrene-polyester resin described in Example IV, (2) the polyvinyl chloride-dioctyl phthalate composition described in Example V, and (3) the mineral oil (Table IV) described in Example VI, there were separately added (a) 5 grams each of the ammonia-treated precipitated silica described in the paragraph immediately above and (b) 5 grams each of said precipitated silica

TABLE V

| Composition | Type silica | Silica wt. percent used [1] | Ammonia concentration [2] | Viscosity in centipoises at 25° C., Brookfield RVT Helipath, TA spindle | | Thixotropy index [3] |
| --- | --- | --- | --- | --- | --- | --- |
|  |  |  |  | 20 r.p.m. | 5 r.p.m. |  |
| Epoxy resin [4] | None | 0 | 0 | 645 | 645 | 1.00 |
| Do.[4] | Aerogel [5] | 3 | 0 | 3,050 | 5,225 | 1.73 |
| Do.[4] | do.[5] | 3 | .25 | 5,140 | [6] 10,105 | [6] 1.96 |

[1] Based on the weight of the composition, e.g., 3 parts SiO₂/98 parts composition.
[2] Based on parts ammonia/100 parts of silica used.
[3] Thixotropy index = $\frac{\text{viscosity at 5 r.p.m.}}{\text{viscosity at 20 r.p.m.}}$
[4] Commercially available under the trademark Epon-815 (the composition also contained 2 parts resorcinol/100 parts resin).
[5] Silica Type IV of Table I (used in Example I).
[6] Higher numerical value for viscosity and thixotropy indicates greater effectiveness.

In order to demonstrate the thickening effectiveness of a precipitated silica dispersed or incorporated in an organic liquid, the procedure set forth in the last paragraph of Example I was repeated with the exception that a precipitated silica, Quso G32, which is a registered trademark of the Philadelphia Quartz Company, was treated with sufficient ammonia to yield a product having a 0.25% by weight, based upon the weight of said silica, per se (i.e., without ammonia treatment); these compositions are summarized in Table VI.

TABLE VI

| Composition | Type silica | Silica wt. percent used [1] | Ammonia concentration [2] | Viscosity in centipoises at 25° C., Brookfield RVT Helipath, TA spindle | | | Thixotropy index [3] |
| --- | --- | --- | --- | --- | --- | --- | --- |
|  |  |  |  | 20 r.p.m. | 10 r.p.m. | 5 r.p.m. |  |
| Polyvinyl chloride-dioctyl phthalate [4] | Precipitated silica [5] | 0 | 0 | 55 | 55 | 55 | 1.00 |
| Do.[4] | do.[5] | 2 | 0 | 690 | 1,000 | 1,600 | 2.32 |
| Do.[4] | do.[5] | 2 | 0.25 | 690 | 1,000 | 1,600 | 2.32 |
| Liquid styrene-polyester resin [6] | do.[5] | 0 | 0 | 900 | 900 | 900 | 1.00 |
| Do.[6] | do.[5] | 2 | 0 | 1,700 | 1,820 | 2,100 | 1.24 |
| Do.[6] | do.[5] | 2 | 0.25 | [7] 1,790 | [7] 2,040 | [7] 2,400 | 1.39 |
| Mineral oil [8] | do.[5] | 0 | 0 | [9] 137 | [9] 137 | [9] 137 | 1.00 |
| Do.[8] | do.[5] | 2 | 0 | 925 | 1,150 | 1,700 | 1.94 |
| Do.[8] | do.[5] | 2 | 0.25 | 900 | 1,100 | 1,600 | 1.77 |

[1] Based on the weight of the composition, e.g., 2 parts SiO₂/98 parts composition.
[2] Based on parts of ammonia/100 parts of silica used.
[3] Thixotropy index = $\frac{\text{viscosity at 5 r.p.m.}}{\text{viscosity at 20 r.p.m.}}$
[4] Same as the material in Table III (Example V).
[5] Commercially available under the registered trademark Quso (G-32).
[6] Same as the material in Table II (Example IV).
[7] Higher numerical value for viscosity and thixotrophy indicates greater effectiveness.
[8] Same as the material in Table IV (Example VI).
[9] No. 1 spindle at 60, 30, and 12 r.p.m. instead of No. TA spindle at 20, 10, and 5 r.p.m.

Thus, it will be noted that not all of the compositions contained ammonia. The ammonia treated precipitated silica material, and the precipitated silica material per se were then mechanically dispersed into the aforementioned organic liquid compositions by means of mixing the materials together for a 4-minute period in an Eppenbach high shear dispersion mixer. After mixing, the viscosities of each of the compositions were then measured at 25° C. by a model LVT Brookfield Viscosimeter using a TA Spindle at 20 r.p.m., 10 r.p.m. and 5 r.p.m. The values obtained from these measurements are shown in Table VI.

It can readily be seen, then, from the data set forth in Table VI that the utilization of a precipitated silica treated with ammonia as contrasted to a precipitated silica per se (i.e., without ammonia treatment), results in substantially no increase in viscosity and in thixotropy when incorporated in an organic liquid. Thus, and as previously mentioned, the precipitated silicas, even when used with ammonia, are not particularly effective thickening agents for organic liquids.

In order to point out the distinction between using the ammonia-treated silica aerogel of the present invention and the use of a prior art ammonia-treated silica containing product when incorporated in various organic liquids, the procedure outlined on page 1488 of the Russian Journal of Physical Chemistry, vol. 38, No. 11, November 1964, was repeated with reference to treating compacted fume silica pellets with ammonia. (The Russian article is entitled "An Infrared Spectroscopic Study of the Specific Adsorption of Ammonia on Silica and a Zeolite" and covers pages 1487 through 1490.) After the compacted fume silica pellets were treated with ammonia, they were hand-ground in a mortar and pestle in order to disperse the resultant particles in the subsequently described organic liquids. A sample of this fume silica treated with ammonia when analyzed was found to contain 0.03% by weight ammonia. (Prior to the ammonia treatment, a sample of the fume silica was analyzed and found to contain approximately 2.5% by weight reactive or neutralizable halogen.)

Five (5) gram samples of (1) the aforementioned (Russian article) ammonia-treated fume silica product which had been hand-ground subsequent to treatment as previously mentioned and (2) the fume silica per se (i.e., without ammonia treatment) of the Rusian article were then added to approximately 245 gram portions of (A) the liquid styrene-polyester resin described in Example IV, (B) the polyvinyl chloride-dioctyl phthalate composition described in Example V, and (C) the mineral oil (Table IV) described in Example VI. The 5-gram samples were dispersed in (A), (B) and (C) by means similar to the dispersion manner set forth in Example IV. Thereafter, viscosity measurements (obtained in the same manner as in Example IV) were conducted on each of the resulting compositions. The values from these viscosity measurements are set forth in Table VII.

It can readily be seen from the values set forth in Table VII that there was no substantial difference in the viscosities of the organic liquids, i.e., items (A), (B) and (C) set forth immediately above, when either the "fume silica per se," i.e., the Russian article "Aerosil," or the (Russian article) ammonia-treated, fume silica was incorporated therein. Thus, the criticality of preparing the present invention thickening agent and the amount utilized is quite apparent in view of the results disclosed in Table VII. It is to be noted that the Russian article is strictly directed to $NH_3$ adsorption on the surface of a highly compacted (i.e., about 42,000 p.s.i.) fume silica pellet and there is no mention whatsoever of using such a pellet as a thickening agent, much less is there a teaching of grinding the pellet into finely divided particles for such a use. Consequently, the aforementioned results, relative to the Russian article, really go beyond the state of the art known prior to the date of the present application art, and show the present invention to be a significant advance over such art.

In addition to the above discussion regarding the use of a compacted silica-containing product, it should be particularly noted that the silica used was a fume silica which contained 2.5% by weight reactive or neutralizable halogen. As previously mentioned in the earlier part of this specification, such a silica product generally contains some reactive or neutralizable halogen or combined halogen and it is believed that as such the fume silica may possibly prevent complete hydrogen bonding with $NH_3$ and thus reduce the effectiveness of said fume silica (after treatment with $NH_3$) as a thickener. In conjunction with this latter point, U.S. Pat. No. 3,269,799 discloses the treatment of a reactive or neutralizable halogen-containing silicon dioxide material, i.e., a fume silica, with ammonia vapor in order to allegedly improve the properties of said silicon dioxide material, e.g., for better dispersion in rubber products to increase the strength thereof. There is no teaching in said patent that such ammonia treated (fume) silica could be used as a thickener or thickening agent. Thus, the disclosure of said patent would tend to substantiate the applicants' belief that an (ammonia-treated) reactive halogen-containing silica product is not substantially more effective as a thickening agent than the fume silica per se for liquid organic compounds, particularly due to the presence of reactive or neutralizable halogen on said fume silica.

What is claimed is:

1. A thickening agent consisting essentially of (a) finely divided particles of amorphous, hydrophilic silica aerogel having at least one silanol group per square millimicron of surface area thereof, and (b) containing at

TABLE VII

| Composition | Type silica | Silica wt. percent used [1] | Ammonia concentration [2] | Viscosity in centipoises at 25° C., Brookfield LVT Helipath, TA spindle | | | Thixotropyl index [3] |
|---|---|---|---|---|---|---|---|
| | | | | 20 r.p.m. | 10 r.p.m. | 5 r.p.m. | |
| Polyvinyl chloride-dioctyl phthalate [4] | (Russian article) fume silica.[5] | 0 | 0 | 60 | 60 | 60 | 1.00 |
| Do.[4] | do.[5] | 2 | 0 | 810 | 1,070 | 1,380 | 1.70 |
| Do.[4] | do.[5] | 2 | .03 | 840 | 1,110 | 1,400 | 1.68 |
| Liquid styrene polyester resin [6] | do.[5] | 0 | 0 | 900 | 900 | 900 | 1.00 |
| Do.[6] | do.[5] | 2 | 0 | 1,750 | 1,800 | 2,080 | 1.26 |
| Do.[6] | do.[5] | 2 | .03 | [7] 1,675 | [7] 1,890 | [7] 2,200 | 1.30 |
| Mineral oil [8] | do.[5] | 0 | 0 | [9] 137 | [9] 137 | [9] 137 | 1.01 |
| Do.[8] | do.[5] | 2 | 0 | 975 | 1,190 | 1,750 | 1.80 |
| Do.[8] | do.[5] | 2 | .03 | 975 | 1,200 | 1,800 | [7] 1.84 |

[1] Based on the weight of the composition, e.g., 2 parts $SiO_2$/98 parts composition.
[2] Based on parts of ammonia/100 parts of silica used.
[3] Thixotropy index = $\frac{\text{viscosity at 5 r.p.m.}}{\text{viscosity at 20 r.p.m.}}$
[4] Same as the material in Table III (Example V, present invention).
[5] The fume silica without ammonia was a fine white powder; the fume silica which had been compacted, ammonia treated, and hand ground was in powder form but slightly larger particle size.
[6] Same as the material in Table II (Example IV, present invention).
[7] Higher numerical value for viscosity and thixotropy indicates greater effectiveness.
[8] Same as the material in Table IV (Example VI, present invention).
[9] No. 1 spindle at 60, 30 and 12 r.p.m. instead of No. TA spindle at 20, 10, and 5 r.p.m.

least 0.10% by weight of ammonia, based on the weight of said silica aerogel, but not substantially more than that required to hydrogen bond said ammonia with said silanol groups; said ammonia being hydrogen bonded by hydrogen bonding between the silanol group of said silica aerogel and the nitrogen atom in the molecular structure of ammonia; said silica aerogel being characterized by having from about 0.1% to about 3.0% by weight carbon, chemically bound to a portion of the siloxy groups, from about 0.1% to about 3.5% by weight hydrogen, an average particle size of from about 0.1 to about 5 microns, a specific surface area of from about 50 to about 1000 square meters per gram, and a loose bulk density of less than 15 pounds per cubic foot.

2. The thickening agent as set forth in claim 1 wherein the number of silanol groups is from about 4 to about 12 and the amount of ammonia is from about 0.10% to about 2.0% by weight ammonia, based on the weight of said silica aerogel.

3. A thickening agent consisting essentially of (a) finely divided particles of an amorphous hydrophilic organo-silica aerogel having from about 4 to about 12 silanol groups per square millimicron of surface area thereof, and (b) containing about 0.10% by weight to about 2.0% by weight of ammonia, based upon the weight of the organo-silica aerogel, but not substantially more than that required to hydrogen bond said ammonia with said silanol groups; said ammonia being hydrogen bonded by hydrogen bonding between the silanol group of said silica aerogel and the nitrogen atom in the molecular structure of ammonia, said organo-silica aerogel is characterized by having substantially no reactive or neutralizable halogen, from about 0.4% to about 1.2% by weight of carbon, chemically bound to a portion of the siloxy groups, from about 0.9% to about 1.5% by weight hydrogen, an average particle size of from about 1 to about 2.5 microns, a specific surface area of from about 100 to about 400 square meters per gram, and an external surface area of from about 1.70 to about 1.95 square meters per gram.

4. A method of preparing a thickening agent which comprises contacting finely divided solid particles of an amorphous, hydrophilic silica aerogel having a loose bulk density of less than 15 pounds per cubic foot and having at least one silanol group per square millimicron of surface area thereof, with ammonia, in a reaction zone, in an amount sufficient to cause said silica aerogel to adsorb at least 0.10% by weght ammonia, but not substantially more than that amount of ammonia required to provide a substantially effective thickening agent, based on the weight of said silica aerogel, said contacting of ammonia and the silica aerogel being conducted in said reaction zone which is maintained at a temperature less than 150° C. and at a pressure of at least 7 pounds per square inch absolute.

5. The method as set forth in claim 4 wherein (1) the silica aerogel is a finely divided, amorphous, organo-silica aerogel comprising a silica polymer having siloxy groups and having from about 4 to about 12 silanol groups per square millimicron of surface area, said organo-silica aerogel being characterized in having from about 1% to about 10% by weight water, based on the weight of said aerogel, an average particle size of between about 1.0 and 2.5 microns, a specific surface area of from about 100 to about 400 square meters per gram, and an external surface area of from about 1.70 to 1.95 square meters per gram, said aerogel being further characterized in containing substantially no reactive or neutralizable halogen, from about 0.4% to about 1.2% by weight carbon, and from about 0.9% to about 1.5% by weight hydrogen chemically bound to a portion of the siloxy groups; (2) the ammonia is in a gaseous state and is present in an amount to provide a coating on said silica aerogel of from about 0.1% to about 2.0% by weight ammonia, based on the weight of the said aerogel, (3) the contacting of said aerogel with ammonia is carried out while said aerogel is fluidized by air, which is the carrier for said ammonia, the air to aerogel ratio being from about .5 ft.$^3$ to about 2 ft.$^3$ per 100 grams of said aerogel and the ammonia-containing air temperature is from about 20° C. to about 70° C., and (4) the period of contacting said aerogel with ammonia is sufficient to adsorb the aforestated quantities of ammonia.

References Cited
UNITED STATES PATENTS

| | | | |
|---|---|---|---|
| 3,210,273 | 10/1965 | Taulli | 252—316X |
| 3,269,799 | 8/1966 | Gunn, Jr. | 23—182 |
| 3,455,826 | 7/1969 | Teicher et al. | 252—28 |

RICHARD D. LOVERING, Primary Examiner

U.S. Cl. X.R.

23—182; 106—308; 117—100; 252—317